(12) United States Patent
Samra

(10) Patent No.: US 7,308,563 B2
(45) Date of Patent: Dec. 11, 2007

(54) DUAL-TARGET BLOCK REGISTER ALLOCATION

(75) Inventor: Nicholas Samra, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 255 days.

(21) Appl. No.: 09/968,278

(22) Filed: Sep. 28, 2001

(65) Prior Publication Data

US 2003/0065910 A1    Apr. 3, 2003

(51) Int. Cl.
  G06F 9/30    (2006.01)
  G06F 9/40    (2006.01)
  G06F 15/00   (2006.01)

(52) U.S. Cl. .................... 712/217; 712/216; 712/214; 712/215

(58) Field of Classification Search ............... 712/214, 712/215, 216, 217
See application file for complete search history.

(56) References Cited

U.S. PATENT DOCUMENTS

| | | | | |
|---|---|---|---|---|
| 5,497,499 A | * | 3/1996 | Garg et al. | 712/217 |
| 5,671,383 A | * | 9/1997 | Valentine | 712/216 |
| 5,694,564 A | * | 12/1997 | Alsup et al. | 712/216 |
| 6,324,640 B1 | * | 11/2001 | Le et al. | 712/217 |

* cited by examiner

Primary Examiner—Alford Kindred
Assistant Examiner—Jesse Moll
(74) Attorney, Agent, or Firm—Trop, Pruner & Hu, P.C.

(57) ABSTRACT

A method and apparatus for dual-target register allocation is described, intended to enable the efficient mapping/renaming of registers associated with instructions within a pipelined microprocessor architecture.

35 Claims, 3 Drawing Sheets

REGISTER BLOCK SHELF USAGE ALGORITHM

| 305 NUMBER OF REMAINING REGISTERS* | 310 ACTION IF RBS IS EMPTY | 315 ACTION IF RBS IS FULL |
|---|---|---|
| | ALLOCATE A NEW BLOCK FROM THE POOL | ALLOCATE A NEW BLOCK FROM THE POOL |
| | ALLOCATE A NEW BLOCK FROM THE POOL, USE 2 OF THE REGISTERS, THEN PLACE THE PARTIALLY USED BLOCK ON THE RSB | TAKE THE BLOCK FROM THE RSB AND USE 2 OF THE UNUSED REGISTERS OF THAT BLOCK |
| | ALLOCATE A NEW BLOCK FROM THE POOL, USE 1 OF THE REGISTERS, THEN PLACE THE PARTIALLY USED BLOCK ON THE RSB | TAKE THE BLOCK FROM THE RSB AND USE 1 OF THE UNUSED REGISTERS OF THAT BLOCK |
| | NO ACTION | NO ACTION |

REGISTER BLOCK SHELF USAGE ALGORITHM

| NUMBER OF REMAINING REGISTERS* | ACTION IF RBS IS EMPTY | ACTION IF RBS IS FULL |
|---|---|---|
| | ALLOCATE A NEW BLOCK FROM THE POOL | ALLOCATE A NEW BLOCK FROM THE POOL |
| | ALLOCATE A NEW BLOCK FROM THE POOL, USE 2 OF THE REGISTERS, THEN PLACE THE PARTIALLY USED BLOCK ON THE RSB | TAKE THE BLOCK FROM THE RSB AND USE 2 OF THE UNUSED REGISTERS OF THAT BLOCK |
| | ALLOCATE A NEW BLOCK FROM THE POOL, USE 1 OF THE REGISTERS, THEN PLACE THE PARTIALLY USED BLOCK ON THE RSB | TAKE THE BLOCK FROM THE RSB AND USE 1 OF THE UNUSED REGISTERS OF THAT BLOCK |
| | NO ACTION | NO ACTION |

FIG. 3

| INSTRUCTION GROUP | # OF DESTINATION REGISTERS IN GROUP | REGISTER BLOCKS ALLOCATED | REMAINING REGISTERS | ACTION FOR RBS |
|---|---|---|---|---|
| A | 8 | #1,#2 | 0 | NONE |
| B | 6 | #3,#4 | 2 | PUT BLOCK #4 ON RBS |
| C | 3 | #5 | 3 | NONE |
| D | 5 | #6,#4 | 1 | TAKE BLOCK #4 FROM RBS |
| E | 4 | #7 | 0 | NONE |
| F | 2 | #8 | 2 | PUT BLOCK #8 ON RBS |
| G | 2 | #8 | 2 | TAKE BLOCK #8 FROM RBS |

FIG. 4

DUAL-TARGET BLOCK REGISTER ALLOCATION

FIELD OF THE INVENTION

The invention described herein relates to the field of microprocessor achitecture. More particularly, the invention relates to register allocation within a register renaming phase of a microprocessor pipeline.

BACKGROUND

In superscalar microprocessors, performance may be improved by using register renaming techniques, in which logical registers referred to by instructions are mapped onto a larger set of physical registers. The physical register mappings for an instruction may be assigned, or "allocated", in or around the renaming stage of the microprocessor pipeline, and may remain allocated until the corresponding instruction is retired.

In superscalar microprocessors containing long pipelines, the number of clock cycles between the renaming stage and the retire stage can be substantial. In order to achieve high-performance, the pipeline needs to remain filled with instructions as much as possible. Architecture features, such as branch prediction, may be used to keep the pipeline filled with instructions, which requires numerous physical registers to be allocated and de-allocated within the pipeline simultaneously. Furthermore, an instruction may require numerous physical registers, which require a large amount of available physical register space. Managing such a large physical register pool can require high-speed circuits that can occupy a relatively large die area.

Various register allocation/de-allocation methods have been implemented in microprocessors, one of which is the "ad hoc" algorithm. FIG. 1 illustrates the "ad hoc" register allocation/de-allocation algorithm. In the "ad hoc" algorithm, as a group of instructions are renamed, destination registers used by the instructions are counted. The destination registers are then allocated and removed from a register pool and used during the executing of the renamed instructions. Once the renamed instructions are retired, the allocated registers are de-allocated and returned to the pool.

At least two characteristics of the "ad hoc" method of register allocation/deallocation make it undesireable within high-performance microprocessors. First, the number of registers required by an instruction group must be determined before the register allocation can occur, which lengthens the rename stage of the pipeline and impacts overall microprocessor performance. Secondly, for microprocessors in which many instructions may be in the renaming stage at once, the number of register destinations corresponding to each group of instructions can be large, further degrading microprocessor performance. In FIG. 1, for example, between zero and eight registers must be allocated and removed from a pool of 256 registers each cycle.

One approach to improving the "ad hoc" method of register allocation/deallocation is by allocating registers in groups, or "blocks". In the block register allocation method, the register are grouped into blocks which are then allocated/de-allocated as atomic units. In FIG. 1, for example, instead of allocating each registers individually, a block of eight registers would be allocated simultaneously, such that only 32 allocation operations (32×8=256) are performed to allocate 256 registers in a worst case. A disadvantage of the block register allocation method is that if not all registers of a block are needed by an instruction group, the unneeded registers are wasted.

Another register allocation method is a "worst case" register allocation method, in which the number of registers allocated during each cycle is equal to the maximum number of regisers that could be required by an instruction group. For example, in FIG. 1, if an instruction group 100 contained eight instructions, and each instruction can write two destinations, then the "worst case" register allocation method would allocate 16 registers during each renaming cycle. After the renaming cycle, any registers that were not needed by the instruction group may be returned to the register pool 105. Although this method facilitates high-performance microprocessor architecture design, it requires an extensive amount of circuitry due to the dynamic nature of the grouping of the registers.

BRIEF DESCRIPTION OF THE DRAWINGS

The features and advantages will become apparent from the following detailed description in which:

FIG. 3 illustrates a register block shelf usage algorithm according to one embodiment of the present invention.

FIG. 4 illustrates an example of a Dual-Target Block Register Allocation according to one embodiment if the present invention.

DETAILED DESCRIPTION

A method and apparatus for dual-target register allocation is described, intended to enable the efficient mapping/renaming of registers associated with instructions within a pipelined microprocessor architecture.

Computer instructions may place into destination registers data, upon which some operation is performed when the instruction is executed. In order to increase the amount of register space that a processor may use as destination registers, a group of registers may be temporarily renamed, or 'mapped', in order to obtain the required number of destination registers. Register mapping may be performed in order to accommodate a large number of instructions being executed within the processor pipeline concurrently, each using one or more destination registers. Once an instruction is fully executed and retired within a processor pipeline, the destination register or registers used by that instruction may be de-allocated and reused by other instructions.

In a processor architecture that performs out-of-order execution, instructions may be scheduled for execution in a non-sequential fashion, thereby making it possible for multiple instructions to be within the processor pipeline at once, and therefore numerous destination registers could be required concurrently. Some superscalar microprocessors may sustain up to 24 instructions in the pipeline concurrently. It is, therefore, necessary to accommodate every destination register required by each instruction within a microprocessor pipeline efficiently and without incurring undue die area cost.

Figure 1:
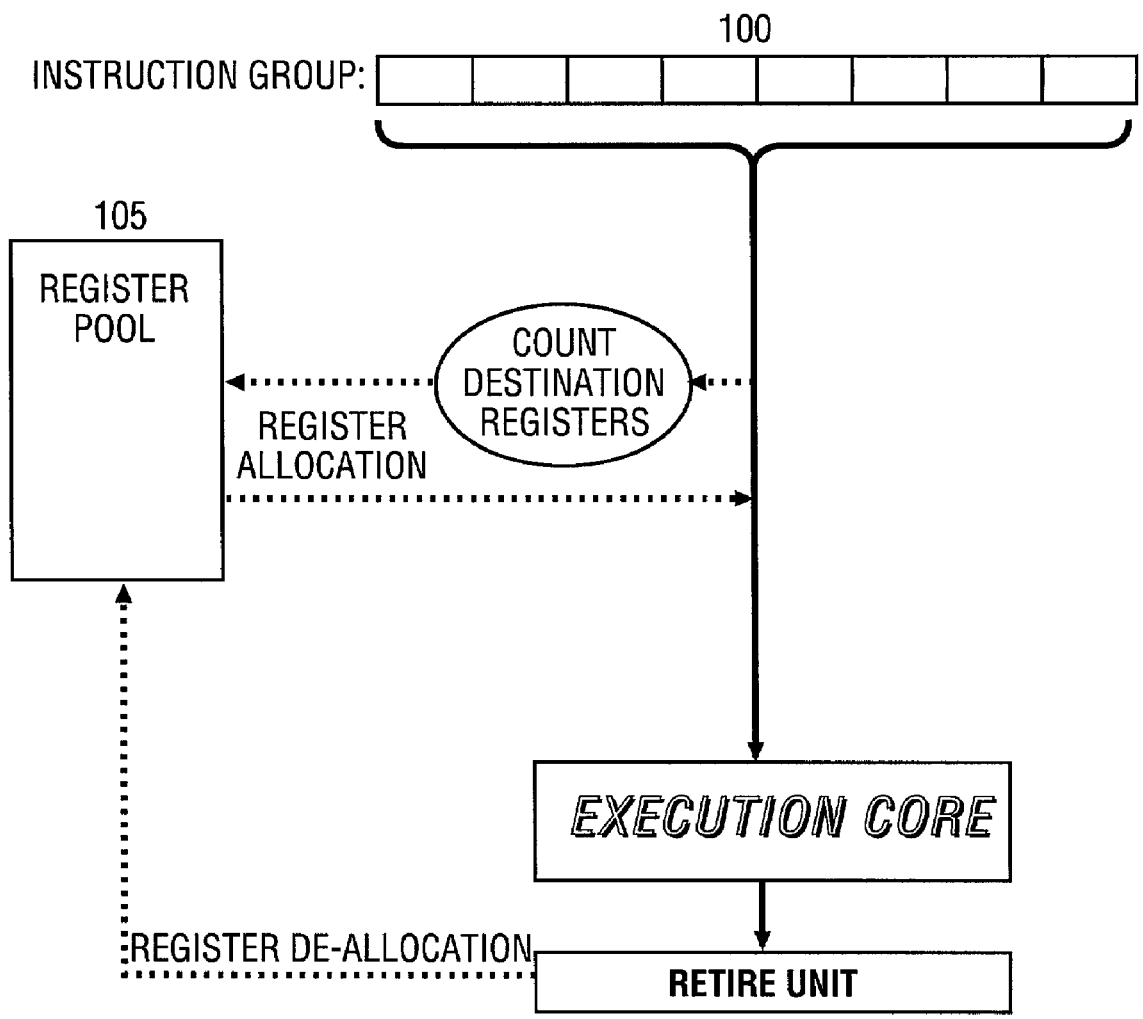
FIG. 1 illustrates a prior art method of register allocation/de-allocation.
Figure 2:
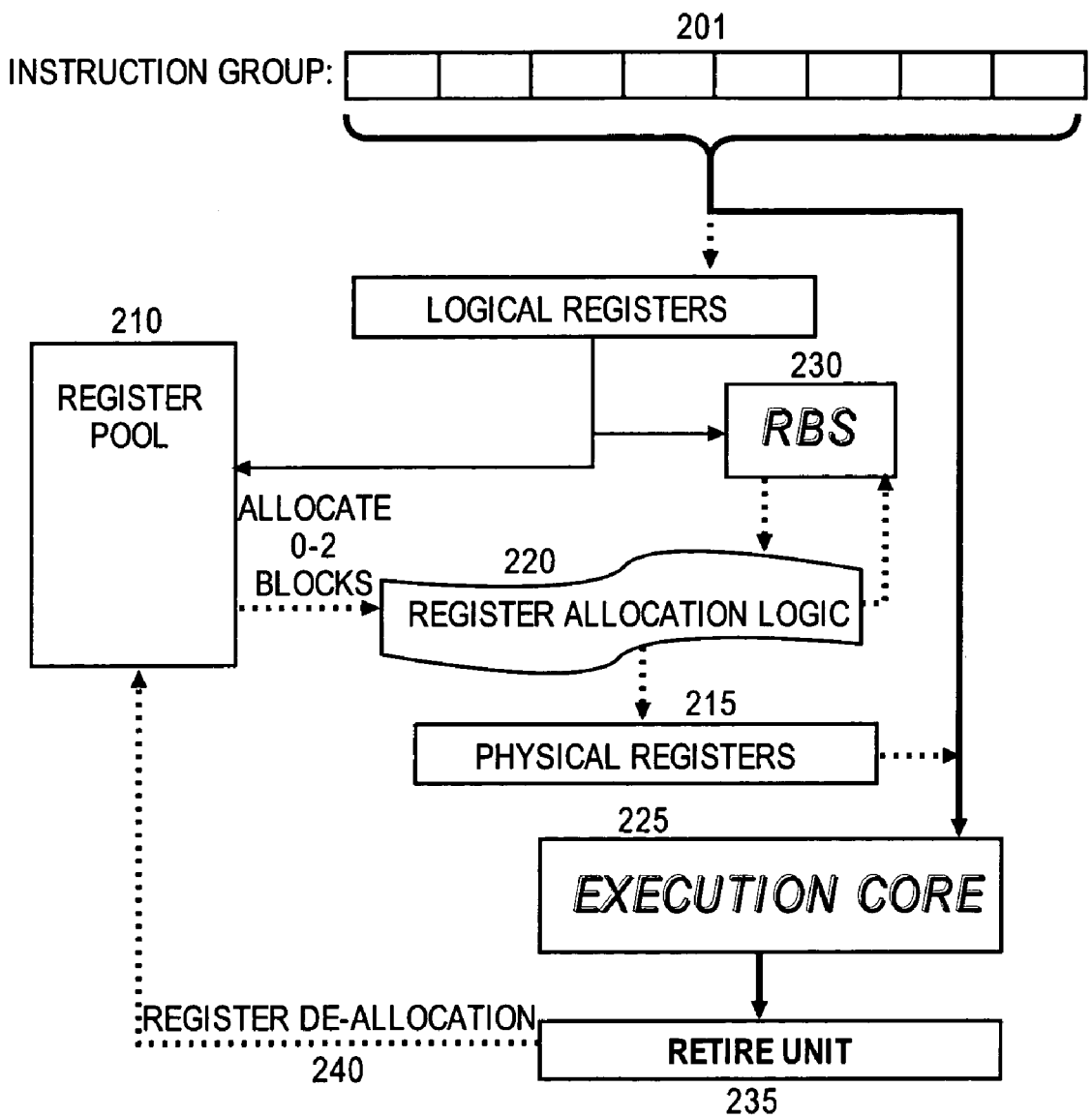
FIG. 2 illustrates dual-target register allocation according to one embodiment of the present invention.

FIG. 2 illustrates a method and apparatus for performing dual-target block register allocation according to one embodiment of the present invention. In this embodiment, an instruction group 201 may contain up to eight instructions, each requiring one destination register. Destination registers required by the instructions may be mapped into up to two register blocks allocated from a register pool 210 of up to 64 register blocks. Up to eight destination registers 215 may be allocated by a register allocation unit (RAU) 220 during a clock cycle while the respective instructions that use those destination registers are being executed within an execution core 225. Each destination register may be mapped into one of four registers within each of the two allocated register blocks. If registers within one of the two allocated register blocks remain un-mapped to a destination register after all destination registers within an instruction group are mapped, the register block containing un-mapped registers may be stored within a register block storage area within the microprocessor, such as a register block shelf (RBS) 230 and retained until a certain number of destination registers are mapped to the remaining registers within the register block or until a certain number of instruction groups have had their destination registers mapped to the register block.

In the embodiment illustrated in FIG. 2, no more than two instruction groups may map registers to a register block. In this embodiment, the RBS is implemented by a hardware storage register used to temporarily store register blocks. In other embodiments, the RBS may be implemented using a storage area within memory structures of a computer system.

Subsequent instruction groups may map a portion of their destination registers to a register block stored within the RBS if there is sufficient space within the stored RBS. Otherwise, subsequent instruction groups may allocate a new register block or pair of blocks, which is one illustration of the dual-target nature of the present invention. Dual-target register allocation refers to the ability for instruction groups to allocate registers either from a register pool or retained within the RBS.

Once a register block becomes full or contains a certain number of remaining registers not mapped to a destination register, the register block may be retrieved by removing the register block from the shelf 230 and passed onto the execution unit executing instructions corresponding to the destination registers mapped to the removed register block. In the embodiment of FIG. 2, an instruction group may either take a register block from the RBS or place a block in the RBS.

Once all instruction groups that use registers within a particular register block have been retired by a retire unit 235, the register block may be de-allocated 240 and reused by other instruction groups. If an instruction group retires, which uses registers mapped to a register block stored within the RBS, the register block is removed from the RBS and returned to the register pool so that it may be used by other instruction groups.

FIG. 3 illustrates a register block shelf usage algorithm according to one embodiment. The first column 305 indicates the number of destination registers that are to be mapped to a register block. The number of destination registers to be mapped to a register block may be determined by calculating the remainder of dividing the total number of destination registers required in a particular instruction group by the register block size.

In one embodiment a register block contains four registers and the instruction group may contain up to eight instructions, each having one or more destination registers to be mapped. In other embodiments, a register block may contain more or fewer than four registers and an instruction group may contain more or fewer instructions. The second column 310 indicates what action is to be taken if the RBS is empty, and the third column 315 indicates what action is to be taken if the RBS is full.

In the embodiment of FIG. 3, if three or four destination registers are to be mapped to a register block, a new register block is allocated from a pool of registers and no register block is stored or removed from the RBS. However, if the number of destination registers to be mapped is one or two and the RBS is not full, the destination registers are mapped to a newly allocated register block and the register block is stored in the RBS. If the number of registers to be mapped is one or two and the RBS is full, the full register block is removed from the RBS and the destination registers are mapped to the remaining registers within the register block. Therefore, any register block stored within an RBS is guaranteed to never have more than two destination registers mapped to it. Finally, if there are no destination registers to be mapped, no action is taken.

FIG. 4 illustrates an example of how dual-target register allocation works according to one embodiment. In the embodiment illustrated in FIGS. 2 and 4, dual-target register allocation is implemented using hardware circuits. In another emodiment, dual-target register allocation is implemented in a machine-readable medium containing instructions to be executed by a processor. Finally, in another embodiment dual-target allocation is implemented using a combination of hardware and software.

In the embodiment illustrated in FIG. 4, an instruction group contains eight instructions, a register block contains four registers, and up to two register blocks may be allocated from a pool of register blocks at once. Refering to FIG. 4, instruction group A requires eight destination registers to be mapped to register blocks containing four registers. Therefore, two register blocks, #1 and #2, are allocated and the registers remaining within either of the allocated register blocks is zero. No action is required regarding the RBS since both register blocks have all four of their registers mapped to, or "filled by", a destination register. Instead, register blocks, #1 and #2, are passed to the execution unit along with the instructions using the destination registers to which the register blocks are mapped. After instruction group A is retired, register blocks #1 and #2 can be de-allocated and returned to the register pool.

Instruction group B contains six destination registers to be mapped to register blocks. Since there is no register block stored in the RBS, register blocks, #3 and #4 are allocated. Register block #3 may have all four of its registers mapped to four destination registers used by instruction group B, leaving register block #4 with two of its registers mapped to the two other destination registers used by instruction group B. Since there are at least two remaining registers in register block #4, it is stored within the RBS while register block #3 is passed to the execution unit with the instructions using destination registers mapped to it.

Instruction group C contains three destination registers to be mapped to register blocks. Since the number of destination registers to be mapped is three, a new register block, #5, is allocated in which to map the three destination registers of instruction group C.

In another embodiment, a comparison may be made between the number of registers to be mapped and the remaining registers within a register stored in the RBS. For example, since the number of destination registers to be mapped is greater than the number of remaining registers within register block #4, which is stored in the RBS, a new register block, #5, is allocated in which to map the three destination registers of instruction group C.

Referring again to instruction group C in FIG. 4, since the RBS has three remaining registers, register block #5 is not stored on the RBS, but passed onto the execution unit with the instructions using destination registers mapped to it. In another embodiment, register block #5 is not stored, because the RBS may contain only one register block at a time. Regardless, once instruction group C is retired, register group #5 may be de-allocated and returned to the register pool.

Instruction group D contains five destination registers to be mapped to register blocks. Therefore, a new register block, #6, is allocated from the register pool and four of the five destination registers are mapped to it. Register block #6 is then passed onto the execution unit along with the instructions using destination registers mapped to it. Once the instruction group using destination registers mapped to register block #6 is retired, register block #6 may be de-allocated and returned to the register pool. The other destination register in instruction group D is mapped to one of the two remaining registers within register block #4, which is stored in the RBS. In this manner, a dual-target register allocation is achieved, as an instruction group may target either a register block within the register pool or a partially-filled register block within the RBS. Since register block #4 has two instruction groups mapped to it, register block #4 is removed from the RBS and passed onto the execution unit. In another embodiment, register block #4 is removed from the RBS and passed onto the execution unit, because the number of remaining registers within register block #4 is less than two after the last destination register of instruction group D is mapped to it. Regardless, once the instruction group using destination registers mapped to register block #4 is retired, register block #4 may be de-allocated and returned to the register pool.

Instruction group E contains four destination registers to be mapped to register blocks. Therefore, a new register block, #7, is allocated from the pool of registers and each of the four destination registers are mapped to it. Since the register block is filled by mapping the four destination registers, it is passed onto the execution unit along with the instruction group using destination registers mapped to it. Once this instruction group is retired, register block #7 will be de-allocated and returned to the register pool.

Instruction group F contains two destination registers to be mapped to register blocks. Since there are no register blocks stored within the RBS, a new register block, #8, is allocated and the two destination registers mapped to it. Since there are at least two remaining register left unmapped within register block #8, it is stored in the RBS.

Instruction group G also contains two destination registers to be mapped to register blocks. Since both destination registers may be mapped into the remaining registers of register block #8, which is stored in the RBS, the two destination registers of instruction group G are mapped to register block #8. Register block #8 is then removed from the RBS since it is now full and passed onto the execution unit. Once the instruction group using destination registers are mapped to register block #8 is retired, register block #8 may be de-allocated and returned to the register pool.

While this invention has been described with reference to illustrative embodiments, this description is not intended to be construed in a limiting sense. Various modifications of the illustrative embodiments, as well as other embodiments, which are apparent to persons skilled in the art to which the invention pertains are deemed to lie within the spirit and scope of the invention.

What is claimed is:

1. A method for mapping destination registers within a computer system comprising:
    allocating a register block from a pool of register blocks;
    mapping a portion of destination registers of a first instruction group to said register block;
    preventing the register block from being used by an instruction of the first instruction group until a remaining number of registers within the register block are mapped to destination registers of a second instruction group following the first instruction group.

2. The method of claim 1 further comprising retrieving said register block from a register block shelf after any of said remaining number of registers within said register block are mapped to a destination register.

3. The method of claim 2 wherein said portion of destination registers is used by an instruction within the first instruction group.

4. The method of claim 3 wherein said register block is de-allocated after said first instruction group using said portion of destination registers is retired.

5. The method of claim 1 further comprising retrieving said register block from a register block shelf after a number of instruction groups have had a destination register mapped to said register block.

6. The method of claim 4 wherein the number of registers in said portion of destination registers is equal to a remainder of dividing a number of destination registers to be used in said first instruction group by a size of said register block.

7. The method of claim 6 wherein said remaining number of registers is two.

8. The method of claim 5 wherein said number of instruction groups is two.

9. An apparatus comprising:
    an instruction group, said instruction group comprising an instruction enabled to use a destination register;
    a register pool comprising a register block, said register block comprising a plurality of registers enabled to be mapped to a plurality of destination registers of the instruction group including said destination register, said register pool being coupled to said instruction group;
    a register block storage area to store the register block from the register pool if the register block includes at least one unmapped register after the instruction group is mapped, said register block storage area being enabled to prevent the register block from being used by an instruction of the instruction group until a remaining number of registers within the register block are mapped to destination registers of a second instruction group following the instruction group.

10. The apparatus of claim 9 further comprising a register allocation unit (RAU), said RAU being enabled to allocate a register block from said register pool to be mapped to said destination register, said RAU being coupled to said register pool and said register block storage area.

11. The apparatus of claim 10 wherein said RAU is further enabled to store said address of said register block to said register block storage area.

12. The apparatus of claim 11 further comprising an execution unit, said execution unit being enabled to execute instructions within said instruction group after said register block has been allocated.

13. The apparatus of claim 12 further comprising a retire unit, said retire unit being enabled to retire said instruction group.

14. The apparatus of claim 13 wherein said retire unit is enabled to de-allocate said register block stored within said register block storage area after said instruction group has been retired.

15. The apparatus of claim 14 wherein said remaining number of registers not mapped to a destination register is two.

16. The apparatus of claim 15 wherein said register block storage area is further enabled to store said register block until a number of instruction groups have had a destination register mapped to said register block.

17. The apparatus of claim 16 wherein said number of instruction groups is two.

18. A machine-readable medium having stored thereon a set of instructions, said set of instructions, when executed by a processor, cause said processor to perform a method comprising:
   allocating a subset of register blocks of a register pool in which to map a plurality of destination registers, said destination registers being associated with a plurality of instructions within an instruction group;
   mapping said plurality of destination registers to said subset of register blocks, each of said subset of register blocks comprising a plurality of registers in which to map said plurality of destination registers;
   storing at least one of the register blocks within a register block storage area if a remaining number of registers within said one of said subset of register blocks are not mapped to destination registers of the instruction group;
   storing the at least one of the register blocks in the register block storage area until at least one of the remaining number of registers is mapped with a destination register of a second instruction group following the instruction group or a predetermined number of instruction groups following the instruction group have had destination registers mapped to the at least one of the register blocks.

19. The machine-readable medium of claim 18 wherein said method further comprises removing said one of said subset of register blocks from said register block storage area if a destination register is mapped to any of said remaining number of registers.

20. The machine-readable medium of claim 19 wherein said method further comprises retiring an instruction group using destination registers mapped to a register block stored within said register block storage area.

21. The machine-readable medium of claim 20 wherein said retiring comprises de-allocating said register block stored within said register block storage area.

22. The machine-readable medium of claim 21 wherein each of said subset of register blocks comprises four registers.

23. The machine-readable medium of claim 22 wherein said subset of register blocks comprises two register blocks.

24. The machine-readable medium of claim 18 wherein a number of registers within a register block to which a destination register is mapped is equal to a remainder of dividing said plurality of destination registers to be mapped by said plurality of registers within one of said subset of register blocks.

25. The machine-readable medium of claim 24 wherein said remaining number of registers is two.

26. A system comprising:
   a first unit to store a group of instructions;
   a second unit to allocate a register block from a pool of register blocks in which to map a destination register associated with said group of instructions;
   a third unit to map the destination register associated with said group of instructions to said register block;
   a fourth unit to prevent the register block from being used by an instruction until a remaining number of registers within the register block are mapped to a destination register associated with a second group of instructions following the group of instructions.

27. The system of claim 26 further comprising a fifth unit to remove said address of said register block from said fourth unit if a destination register is mapped to any of said remaining number of registers within said register block.

28. The system of claim 27 further comprising a sixth unit to retire an instruction group, said instruction group using a destination register mapped to said register block.

29. The system of claim 28 wherein said sixth unit is to enable said register block to be de-allocated after an instruction group using destination registers mapped to said register block is retired.

30. The system of claim 29 wherein said remaining number of registers is two.

31. A method comprising:
   determining a number of destination registers of a first instruction block to be mapped to a register block;
   allocating a new register block from a register pool and mapping the destination registers to the new register block if the number of destination registers is greater than or equal to a first threshold;
   mapping the destination registers to a previously allocated register block if the number of destination registers is less than the first threshold, the previously allocated register block allocated during a previous instruction group and stored in a register block shelf.

32. The method of claim 31, further comprising storing the previously allocated register block to the register block shelf if the previously allocated register block has less than a threshold number of registers mapped therein.

33. The method of claim 32, further comprising passing the previously allocated register block from the register block shelf to an execution unit after the destination registers are mapped thereto.

34. The method of claim 32, further comprising passing the previously allocated register block from the register block shelf to an execution unit after the first instruction block and a second instruction block have been mapped thereto.

35. The method of claim 31, further comprising passing the new register block to an execution unit with the first instruction block.

* * * * *